US009769731B2

(12) United States Patent
Roberts et al.

(10) Patent No.: US 9,769,731 B2
(45) Date of Patent: *Sep. 19, 2017

(54) WIRELESS NETWORK HOST IN SILENT MODE

(71) Applicant: Microsoft Technology Licensing, LLC, Redmond, WA (US)

(72) Inventors: David A. Roberts, Redmond, WA (US); Hui Shen, Beijing (CN); Christopher D. Gual, Seattle, WA (US); Anirban Banerjee, Santa Clara, CA (US); Yi Lu, Sammamish, WA (US); John W. Archer, Marysville, WA (US); Michael Bell, Herndon, VA (US); Xiong Jiang, Bellevue, WA (US); Anirudh Anirudh, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/088,652

(22) Filed: Apr. 1, 2016

(65) Prior Publication Data

US 2016/0360470 A1 Dec. 8, 2016

Related U.S. Application Data

(63) Continuation of application No. 14/621,389, filed on Feb. 13, 2015, now Pat. No. 9,307,398, which is a
(Continued)

(51) Int. Cl.
*H04W 48/10* (2009.01)
*H04W 48/14* (2009.01)
(Continued)

(52) U.S. Cl.
CPC .............. *H04W 48/10* (2013.01); *H04W 8/08* (2013.01); *H04W 8/22* (2013.01); *H04W 48/14* (2013.01)

(58) Field of Classification Search
CPC ......... H04W 8/08; H04W 8/22; H04W 48/10; H04W 48/14
See application file for complete search history.

(56) References Cited

U.S. PATENT DOCUMENTS 5,838,720 A 11/1998 Morelli
7,216,365 B2 5/2007 Bhagwat et al.
(Continued)

FOREIGN PATENT DOCUMENTS

WO 2005011183 A 2/2005

OTHER PUBLICATIONS

"Soft AP Solutions," Marvell, http://www.marvell.com/products/wireless/softap.jsp, 1 page, Oct. 31, 2008.
(Continued)

*Primary Examiner* — Paul H Masur
(74) *Attorney, Agent, or Firm* — Davin Chin; Chin IP, PLLC

(57) ABSTRACT

An access point that implements operating modes in which beacons may be selectively disabled. Beacons may be disabled when no device is actively associated through the access point. Beacons may be enabled in response to one or more triggers, which may include events such as a client forming an association through the access point following a probe request message identifying the access point. In addition, active beaconing may be triggered by user input or may occur during periodic brief intervals that allow client devices to discover the network identifier for the access point. Selective control of beaconing may lead to more effective wireless communication, particularly in areas (Continued)

where users congregate with computers implementing soft APs for personal networks.

20 Claims, 5 Drawing Sheets

Related U.S. Application Data continuation of application No. 13/753,234, filed on Jan. 29, 2013, now Pat. No. 8,958,405, which is a continuation of application No. 12/125,034, filed on May 21, 2008, now Pat. No. 8,374,159.

(51) Int. Cl.
*H04W 8/22* (2009.01)
*H04W 8/08* (2009.01)

(56) References Cited

U.S. PATENT DOCUMENTS

| | | |
|---|---|---|
| 7,284,062 B2 | 10/2007 | Krantz et al. |
| 7,292,545 B2 | 11/2007 | Maki et al. |
| 7,349,544 B2 | 3/2008 | Tiwari |
| 2004/0103278 A1 | 5/2004 | Abhishek et al. |
| 2004/0192284 A1 | 9/2004 | Vaisanen et al. |
| 2004/0235536 A1 | 11/2004 | Kim et al. |
| 2005/0078624 A1 | 4/2005 | Shu et al. |
| 2005/0154933 A1 | 7/2005 | Hsu et al. |
| 2006/0039337 A1 | 2/2006 | Hodoshima |
| 2006/0121916 A1 | 6/2006 | Aborn et al. |
| 2006/0171388 A1 | 8/2006 | Ikeda |
| 2006/0203850 A1 | 9/2006 | Johnson et al. |
| 2006/0221927 A1 | 10/2006 | Yamada et al. |
| 2006/0285527 A1 | 12/2006 | Gao et al. |
| 2006/0285528 A1 | 12/2006 | Gao et al. |
| 2007/0049339 A1 | 3/2007 | Barak et al. |
| 2007/0053315 A1 | 3/2007 | Sugaya |
| 2007/0171884 A1 | 7/2007 | Irie et al. |
| 2007/0189249 A1 | 8/2007 | Gurevich et al. |
| 2007/0286136 A1 | 12/2007 | Rittle et al. |
| 2008/0026788 A1 | 1/2008 | Hamada |
| 2008/0031208 A1 | 2/2008 | Abhishek et al. |
| 2008/0072292 A1 | 3/2008 | Narjala |
| 2008/0232286 A1 | 9/2008 | Habetha et al. |

OTHER PUBLICATIONS

"Wireless 802.11n PCI Card User Manual, Model 523981," Intellinet Network Solutions, http://www.intellinet-network.com/download/281-523981_manual.pdf, 48 pages, downloaded Oct. 31, 2008.

Churchill, S., "Software Access Point Roundup," 11 pages, Jan. 12, 2004.

Dennis et al., "The Wireless Ubiquitous Surveillance Testbed," Naval Postgraduate School Thesis, Mar. 2003, Monterey, CA, 125 pages, (2003).

Han et al., "Performance Analysis of Sleep Mode Operation in IEEE 802.16e Mobile Broadband Wireless Access Systems," 5 pages (2006).

Ingersoll-Rand, "Locking/Unlocking a Wyreless Access Point Module (WAPM) Upon Demand," Application Note: A664-007-A, Schlage Wyreless Access, pp. 1-3 (2003-2004).

International Search Report and Written Opinion for International Application No. PCT/US2009/064844 filed Nov. 17, 2009, 10 pages, mailed May 28, 2010.

Kravets et al., "Power Management Techniques for Mobile Communication," pp. 157-168 (1998).

Sutherland, E., "The Software Access Point," ISP News, 3 pages, May 2, 2002.

"Final Rejection Issued in U.S. Appl. No. 12/125,034", Mailed date: Jul. 6, 2012, 28 Pages.

"Non Final Office Action Issued in U.S. Appl. No. 12/125,034", Mailed date: Apr. 28, 2011, 25 Pages.

"Non-Final Rejection Issued in U.S. Appl. No. 12/125,034", Mailed date: Dec. 6, 2011, 28 Pages.

"Non-Final Rejection Issued in U.S. Appl. No. 14/621,389", Mailed Date: Jun. 30, 2015, 10 Pages.

"Notice of Allowance Issued in U.S. Appl. No. 12/125,034", Mailed Date: Oct. 9, 2012, 10 Pages.

"Notice of Allowance Issued in U.S. Appl. No. 13/753,234", Mailed Date: Oct. 7, 2014, 9 Pages.

"Notice of Allowance Issued in U.S. Appl. No. 13/896,195", Mailed Date: Nov. 25, 2015, 12 Pages.

WIRELESS NETWORK HOST IN SILENT MODE

CROSS-REFERENCE TO RELATED APPLICATION(S)

This application is a continuation application of U.S. patent application Ser. No. 14/621,389, filed on Feb. 13, 2015, now U.S. Pat. No. 9,307,398, issued Apr. 5, 2016, which a continuation application of U.S. patent application Ser. No. 13/753,234, filed on Jan. 29, 2013, now U.S. Pat. No. 8,958,405, issued Feb. 17, 2015, which is a continuation of U.S. patent application Ser. No. 12/125,034, filed on May 21, 2008, now U.S. Pat. No. 8,374,159, issued Feb. 12, 2013. Each of the afore-referenced applications is hereby incorporated by reference.

BACKGROUND

Wireless communication provides significant flexibility to computer users. By communicating wirelessly, computer users may simply create a network or may have network connectivity as they move their computers from place to place. In a typical wireless local area network (WLAN), a wireless client connects to an access point (AP), and communication is enabled between the client and a network.

An AP is a piece of equipment that allows devices to connect to a network. Access points, for example, are used to allow wireless clients to connect to a wired network, enabling the wireless clients to use devices connected to the wired network. APs may be self-contained hardware devices. Alternatively, computing devices (e.g., laptops) can be adapted to act as APs through the use of software. Such software-based access points or "soft APs" may allow a wireless client to access services not only on a network to which the computing device is connected but also on the computing device itself.

Access points operate according to protocols that enable client devices to form network connections. Wireless access points frequently advertise their presence by broadcasting beacons at regular intervals. Each beacon frame may carry such information as the beacon interval, timestamp, service set identifier (SSID), supported data rates, and other pertinent data regarding the access point. The SSID identifies a specific network for which access is provided by the access point. Though, not all of this information may be broadcast in every scenario. For example, some access points may opt to disable the SSID from being broadcast in beacon frames to reduce security issues.

In addition to enabling a client device to find an access point, the periodic beacons can synchronize operation of client devices once they are associated with the network. For example, a beacon signal may indicate whether there are messages waiting for the client at the AP. Such a protocol allows more efficient operation of a client because it only needs to monitor for incoming messages at periodic beacon intervals and following receipt of beacons that indicate the access point has buffered messages for the client.

SUMMARY

Devices operating as wireless access points may be configured to selectively operate in a silent mode. In silent mode, the access point broadcasts beacons at a lower rate than during an active mode in which a device is associated with the access point. The access point may switch between silent and active modes in response to trigger events.

Accordingly, in one aspect, the invention relates a method of operating a host computing device adapted to act as an access point to at least one network. The method includes operating in a first mode in which beaconing is not enabled. When the host computing device receives a trigger, it switches to a second mode in which beaconing is enabled.

In another aspect, the invention relates to a method of operating a host computing device adapted to act as an access point to at least one network. The method includes operating in a first mode in which beacons are broadcast at a first rate. In response to receiving the trigger, the host operates in a second mode in which beacons are broadcast at a second rate. The second rate is slower than the first rate.

In a further aspect, the invention relates to a computer storage medium comprising computer-executable instructions for controlling a wireless network interface to act as an access point to a network. The access point operates in a first mode in which beacons are broadcast at a first rate. In response to receiving a first trigger, the access point operates in a second mode in which beacons are broadcast at a second rate. In response to receiving a second trigger, the access point operates in the first mode. The first rate is slower than the second rate.

BRIEF DESCRIPTION OF DRAWINGS

The accompanying drawings are not intended to be drawn to scale. In the drawings, each identical or nearly identical component that is illustrated in various FIGs. is represented by a like numeral. For purposes of clarity, not every component may be labeled in every drawing. In the drawings.

DETAILED DESCRIPTION

Figure 1:
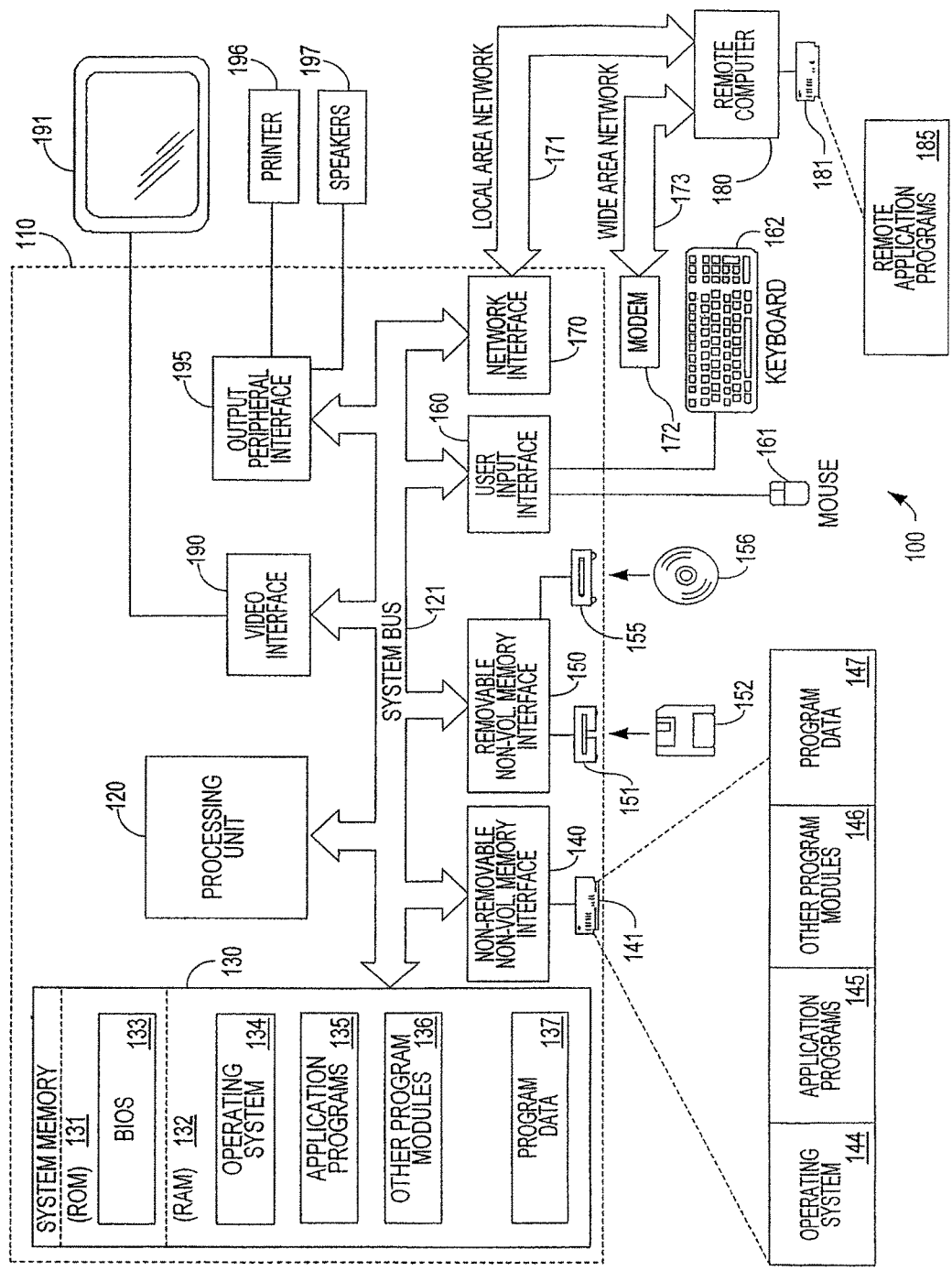
FIG. 1 is a conceptual block diagram of a computer system in which embodiments of the invention may be practiced.

The inventors have recognized and appreciated that, as users take advantage of soft access point functionality in computing devices, there is a risk that in locations where computer users congregate there will be multiple devices broadcasting beacons. The inventors have further recognized that multiple beaconing devices operating within transmit range of each other will create spectrum congestion that can interfere with effective communication. When a client or soft access point connected as one network needs to exchange information, their communication may be disrupted by other devices broadcasting beacons.

Though wireless communication protocols are designed to continue operation despite occasional disruptions of this type, as the disruptions become more frequent, the throughput supported by a connection decreases. If the disruptions are too frequent, effective communication is foreclosed.

Though, even if disruptions caused by in-range soft APs are not so severe that they prevent communication, they can reduce supported data rates to the point that a user's experience is negatively impacted. Such disruptions could arise, for example, in private offices or public places in which mobile computer users may congregate.

Thus, use of soft access points, and particularly soft access points in mobile devices, may create problems that are not prevalent with current wireless networks. For example, as mobile computer users more frequently use soft AP functionality to implement personal area networks between their computers and other devices, such as smart phones and music players, there will be more access points in general. Moreover, these access points may be concentrated in areas where people tend to congregate, such as offices, conference centers, and other public places.

Further, the inventors have recognized and appreciated that more mobile APs (e.g., laptops acting as soft APs) with less frequently consumed services, can operate differently than current fixed APs. Such soft APs may desirably be able to operate in a way that consumes less of the available spectrum by reducing the instances in which they broadcast beacons.

Accordingly, some embodiments of the invention provide a new silent mode for wireless network hosting where the beacon of an AP may be suppressed when there are no devices associated with the wireless network or when beaconing is not otherwise necessary. The beacon could be activated when necessary, upon the receipt by the AP of an appropriate trigger. Likewise, beaconing may be deactivated in response to a trigger. In some embodiments, the AP, even though not beaconing, may continue to monitor transmissions from potential clients, in which case the trigger that activates beaconing may be initiated by actions taken by a potential wireless client. In embodiments in which a beacon is used to enable client devices to locate the access point, the beaconing may be triggered at periodic intervals and then disabled after an interval that may be long enough to allow a client device to discover the access point. In other embodiments in which a beacon is used to synchronize communication with one or more clients, the beaconing may be triggered once a client forms an association through the access point and disabled once all clients disassociate from the access point or at some time after clients disassociate. Though, the triggers may come from any suitable sources, including user input or through an application executing on the host AP itself.

FIG. 1 illustrates an example of a suitable computing system environment 100 on which embodiments of the invention may be implemented. The computing system environment 100 is only one example of a suitable computing environment and is not intended to suggest any limitation as to the scope of use or functionality of embodiments of the invention. Neither should the computing environment 100 be interpreted as having any dependency or requirement relating to any one or combination of components illustrated in the exemplary operating environment 100.

Embodiments of the invention are operational with numerous other general purpose or special purpose computing system environments or configurations. Examples of well known computing systems, environments, and/or configurations that may be suitable for use with embodiments of the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Embodiments of the invention may be described in the general context of computer-executable instructions, such as program modules, being executed by a computer. Generally, program modules include routines, programs, objects, components, data structures, etc. that perform particular tasks or implement particular abstract data types. Embodiments of the invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing embodiments of the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

The computer 110 may be connected to various networking environments through a network interface or adapter 170. Network interface 170 may comprise a wired LAN card. Communication over a wired connection may be in accordance with the Ethernet protocol or any other suitable protocol. Alternatively or additionally, network interface 170 may comprise a wireless LAN or wireless WAN card, allowing computer 110 to access a network using wireless technology. A wireless LAN card may be configured to communicate according to the IEEE 802.11 (WiFi) standard, or any other suitable protocol. A wireless WAN card may be configured to communicate according to the IEEE 802.16 (WiMAX) standard, or any other suitable protocol.

Such wireless LAN and WAN cards comprise a radio transmitter and receiver which respectively send and receive wireless signals for communication with at least one device in a wireless network. The computer 110 may include a driver and/or other programmed instructions through which it communicates with the radio hardware. For example, radio hardware may be made available by an independent vendor who also provides the driver and/or other programmed instructions through which the computer (e.g., operating system 144) may communicate with, and invoke various functionality provided by, the radio. These programmed instructions may include any component(s) comprising a hardware interface adapted to communicate with radio hardware, provide control signals to radio hardware, and/or receive information regarding wireless signals received by radio hardware from one or more wireless networks.

When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism.

In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

To support operation in silent mode, operating system 144 may be programmed to control a radio, such as a radio associated with a wireless network interface, to selectively suppress beaconing.

Figure 2:
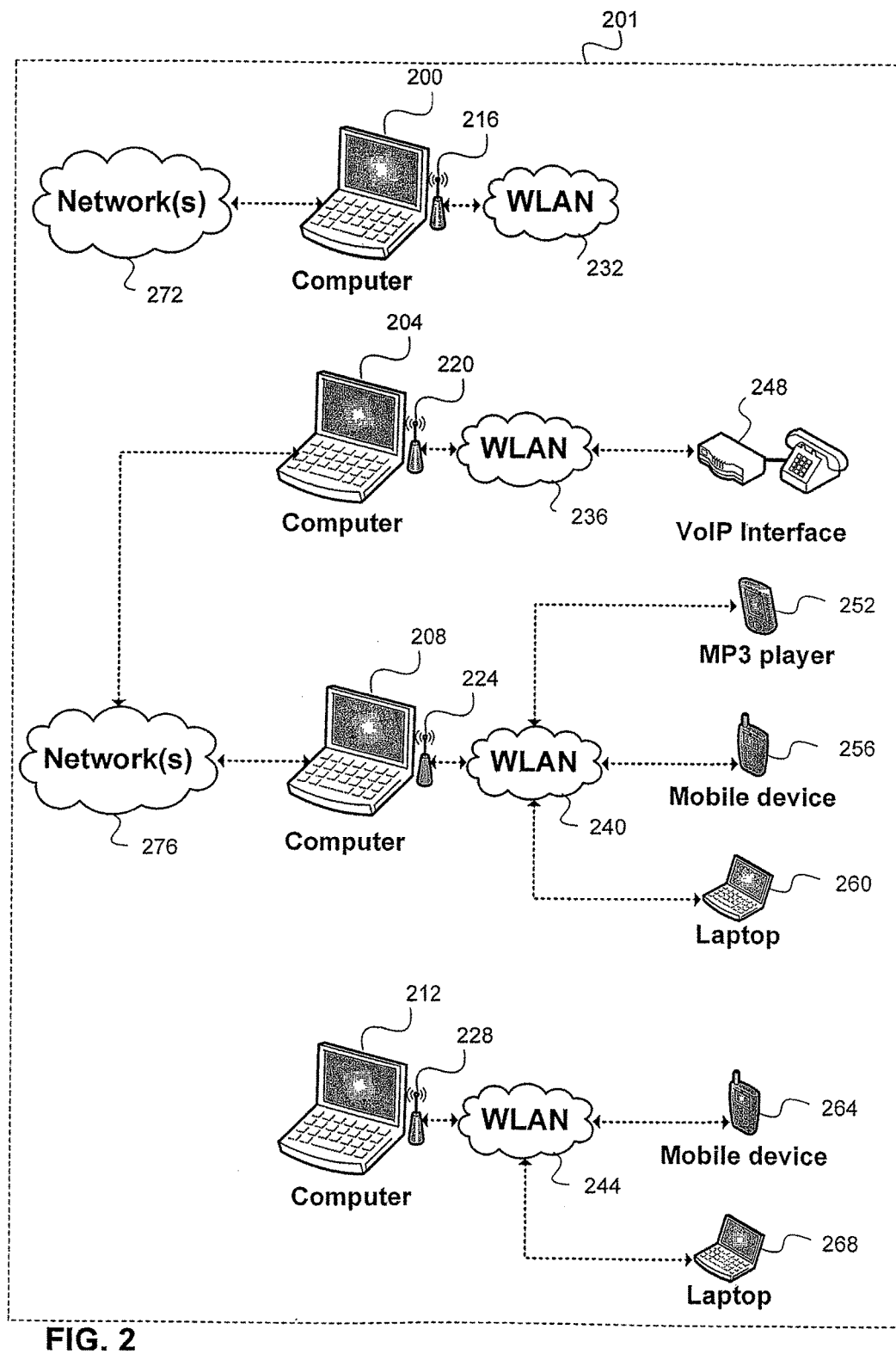
FIG. 2 is a block diagram depicting an example topology in scenarios wherein several computers are operating as access points, in accordance with some embodiments of the invention.

FIG. 2 illustrates an example connectivity scenario in accordance with some embodiments of the invention in which selectively suppressing beaconing may be employed. In this example embodiment, computers 200, 204, 208, and 212 employ software-enabled access point functionality. Computers 200, 204, 208, and 212 are congregated within an area 201 that places the computers in range of each other for purposes of wireless communication. Accordingly, if these devices emit beacons, the beacons from one computer may interfere with communication by another computer.

Radios 216, 220, 224, and 228 on computers 200, 204, 208, and 212 respectively are enabled via software to allow each computer to perform as a wireless AP. Although these APs are schematically illustrated, it should be noted that each radio depicted may be part of a computer's wireless network interface 170 or may be implemented in any other suitable way. As such, wireless client or device 248 is able to connect to computer 204 via WLAN 236 established by radio 220.

Computer 208 is also configured to act as a wireless access point, and each of devices 252, 256, and 260 is able to connect to computer 208 via WLAN 240 established with radio 224. In this example, computer 208 and devices 252, 256, and 260 may be configured as a form of personal area network (PAN).

Similarly each of devices 264 and 268 is able to connect to computer 212 via radio 228 and WLAN 244. Any of these devices may employ any services accessible on the computer or soft access point to which each device is connected. Additionally, via computers 204 and 208, devices 248, 252, 256, and 260 are able to connect to another network 276 (e.g., the Internet) to which computers 204 and 208 are connected. In this particular example, no devices are presently connected to computer 200. Also, computer 212 is not connected to any outside network; in this instance, the "network" to which computer 212 is providing access could be one or more services or components within the computer 212 itself. Thus, FIG. 2 illustrates that there are multiple reasons that a computer may be configured as a wireless access point and it is possible that multiple such computers may exist in an area 201. Four computers acting as APs, six devices, and two networks are shown for simplicity; but the number of APs, devices, and networks is not a limitation on the invention, and any suitable number may be used.

In this embodiment, each of the devices depicted in FIG. 2 are within wireless access range of each of the four computers 200, 204, 208, and 212 acting as APs. The combination of connections depicted is simply an example, and any number of groupings of devices with APs is possible. If computers 200, 204, 208, and 212 were implemented as access points as known in the art, all four APs would be continuously beaconing via the transmitter of radios 216, 220, 224, and 228. Instead, in embodiments of the invention, AP 200 would operate in a silent beaconing mode, as it does not have any wireless clients or devices actively associated with either itself or network 272.

Figure 3:
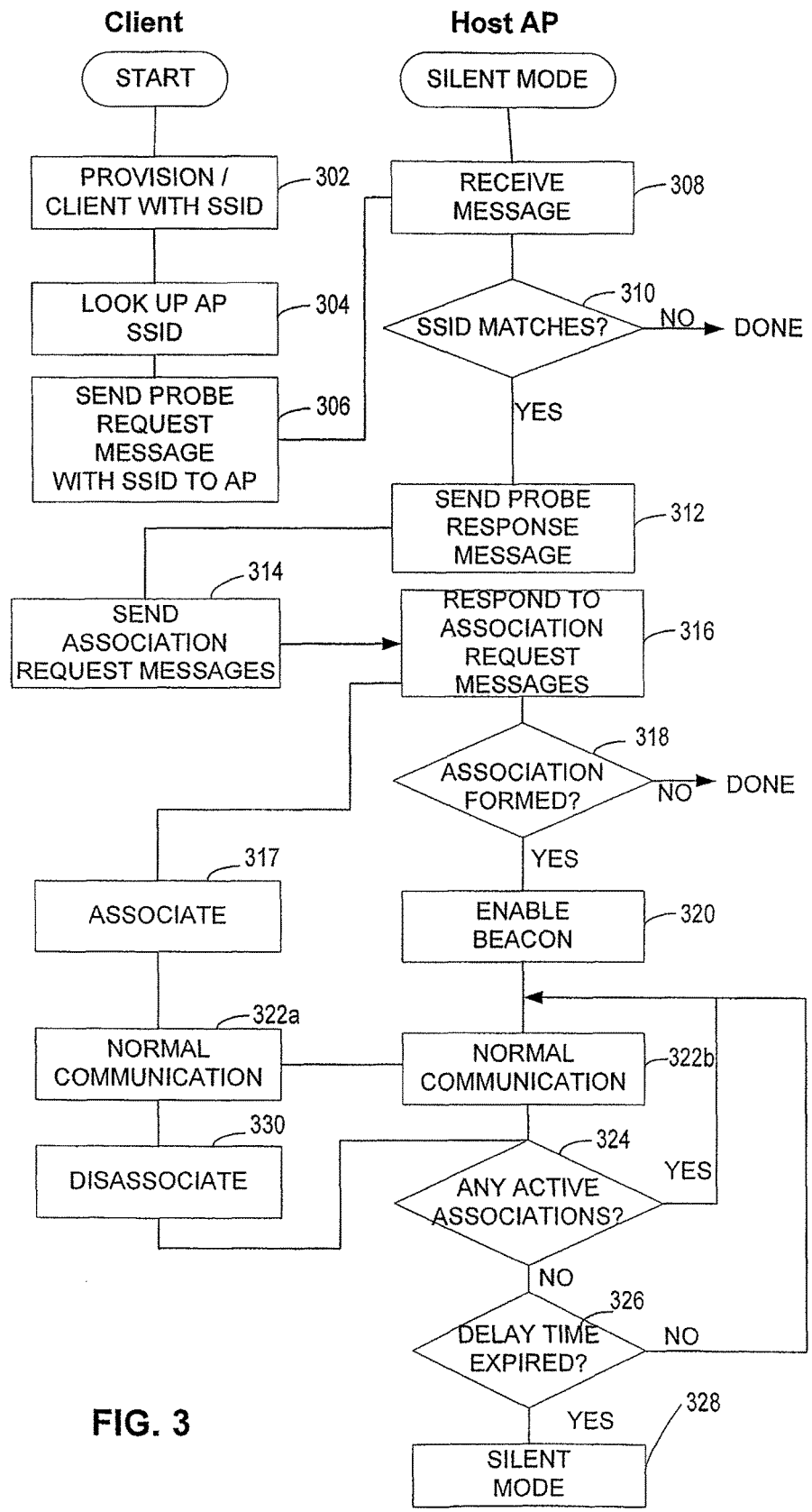
FIG. 3 is a flowchart demonstrating how a host AP may toggle between a silent mode and an active beaconing mode, based on triggers initiated by a wireless client, in accordance with some embodiments of the invention.
Figure 4:
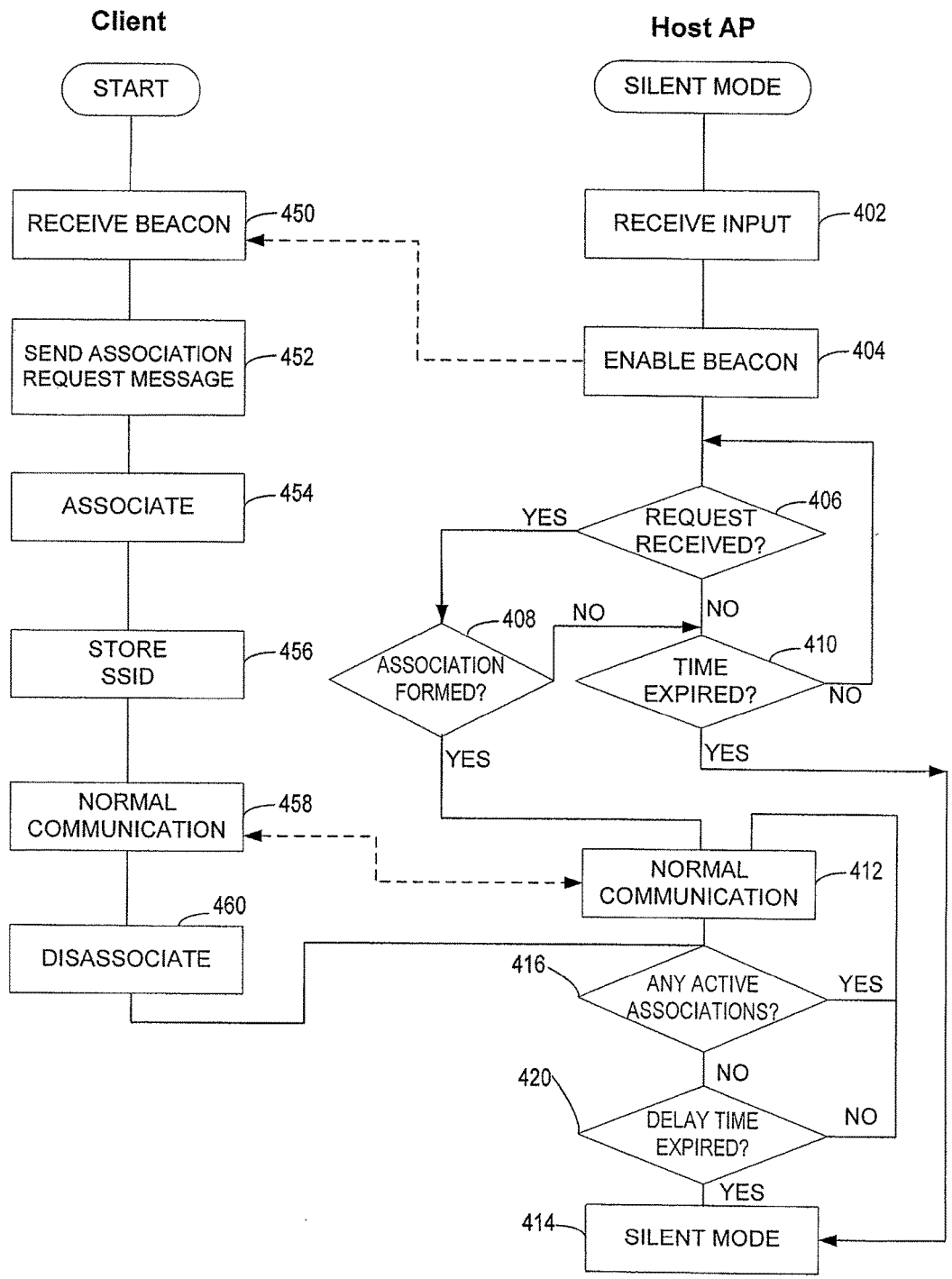
FIG. 4 is a flowchart demonstrating how a host AP may toggle between a silent mode and an active beaconing mode, based on triggers initiated by the host AP, in accordance with embodiments of the invention.

The flowchart of FIG. 3 demonstrates how a host AP may toggle between a silent mode and an active or enabled beaconing mode, based on triggers initiated by the wireless client, in accordance with some embodiments of the invention. In this example, in step 302, a wireless client (e.g., device 256) is initialized or provisioned with the SSID for a network (e.g., network 240) hosted by an AP (e.g., AP 224). This provisioning can be done by providing information other than by direct communication between the host computer and the client device (i.e. an "out of band" communication), or in any suitable way, including manually, via a wired connection to the AP, or via a wireless connection to the AP as discussed below with respect to FIG. 4. Meanwhile, the initial or default configuration of the host AP is the silent mode, where no beacons are being transmitted. Rather, the host AP is passively listening for probe requests coming from a client that are directed specifically to its SSID.

When the wireless client attempts to connect to a network, it may obtain an SSID for the network. The SSID may be obtained in any suitable way, such as by looking up the desired SSID for that network in step 304 that has been provisioned in the client. The client then determines the presence of the network by sending out probe request messages (e.g., via the WiFi protocol or any other suitable protocol) that include the specific SSID for the network (step 306). Upon receipt of a probe request message in step 308, the host AP determines whether to respond by checking if the probe request matches the network. For example, the AP may check if the SSID matches its network (step 310). Alternatively, any suitable criteria may be used to determine whether the probe request matches the network, as the use of SSID matching is not a limitation on the invention. In the illustrated embodiment, the host AP ignores any probe requests with a different or no SSID specified. On the other hand, if the probe request is deemed to be directed to an SSID matching the AP's network, the host AP will in turn respond. In this embodiment, the host AP responds (step 312) with a probe response message (e.g., via the WiFi protocol or any other suitable protocol)—provided that any other information in the probe request message is compliant with any other local policies that may be in place within the AP.

At step 314, the client can then proceed by sending an association request message to the host AP, which will respond accordingly in step 316 (e.g., via the WiFi protocol or any other suitable protocol). Provided that the association request is accepted by the AP, an association between the client and the network will be formed (steps 317 and 318), and the association will be recorded in some suitable location within the AP (e.g., an association table). At that point (step 320), the successful association may trigger the host AP to enable normal beaconing procedures, which leads to normal communications between the host AP and the client, per the WiFi protocol or any other suitable protocol (steps 322a and 322b).

The host may be controlled to enable beaconing in any suitable way. For example, a network interface card may have a control interface that accepts commands that specify operating parameters of the network interface card. Those commands may include commands that enable or disable beaconing or that set the rate at which beacons are broadcast. Beaconing will continue, provided any associations remain active (e.g., as noted in the association table). When communication is complete, the wireless client may disassociate (step 330). When the last associated client disassociates or is disassociated (step 324), the host AP may enter back into silent beacon mode (step 328). Disabling beaconing in this fashion prevents unnecessary use of the frequency spectrum.

Alternatively, in step 326, the host AP may choose to delay changing back to silent mode. The period of delay may be determined in any suitable way, such as based on instructions from an internal logic unit or application within the AP (e.g., software or application programming interface (API) in the operating system or in a driver). This would permit the network to continue to be visible for some time after the last station has disassociated so that other services could be consumed, if deemed necessary by the host AP.

FIG. 3 illustrates one possible method of interaction between a client device and a host that implements selective beaconing. Other methods are possible. For example, the flowchart of FIG. 4 demonstrates how a host AP may toggle between a silent mode and an active or enabled beaconing mode, based on triggers initiated by the host AP, in accordance with other embodiments of the invention. The initial or default configuration of the host AP is the silent mode, where no beacons are being transmitted. Rather, the host AP is passively listening for probe requests coming from a client that are directed specifically to its SSID. In step 402, an input from within the host AP may act as a trigger to activate beaconing. The triggering input can be generated by an internal logic unit or application within the AP or in any suitable way (e.g., via software or API in the operating system or in a driver or via user input).

In response to the triggering input, the host AP enables beaconing (step 404). This beaconing activation can be done via a control signal to the radio transmitter of the host AP. The control signal may be the triggering input itself, or it may be generated separately in a similar fashion as the triggering input or in any suitable way. The control signal may include an upper threshold value indicating a maximum period of time during which beaconing is to remain enabled without any association requests (e.g., transmitted via the WiFi protocol or any other suitable protocol) received from a wireless client and/or any successful associations formed between a wireless client and the network hosted by the AP. If no such associations are formed before expiration of the maximum time period (step 410), then the host AP may toggle back to the silent beacon mode (step 414). The disabling of the beacon can be done by commands passed to a control interface of a network interface or in any suitable way.

Alternatively, upon completion of step 404, request messages from a wireless client may be received by the host AP in step 406 (e.g., probe request and/or association request messages via the WiFi protocol or any other suitable protocol) leading to a successful association being formed in step 408 before expiration of the maximum time period. If that occurs, the association will be recorded in some suitable location within the AP (e.g., an association table). At that point (step 412), this successful association may trigger the host AP to continue normal beaconing procedures and conduct normal communications between the host AP and the client, per the WiFi protocol or any other suitable protocol (step 412).

As these steps take place on the host AP, several parallel actions may occur within the wireless client. Namely, after beaconing is enabled on the host AP (step 404), the wireless client may receive beacon frames containing the SSID of the network hosted by the AP (step 450). This allows the client to send an association request message to that host AP (step 452), which will respond accordingly in step 408 (e.g., via the WiFi protocol or any other suitable protocol). Provided that the association request is accepted by the AP, an association between the client and the network will be formed (steps 454 and 408), leading to normal communications between the host AP and the client, per the WiFi protocol or any other suitable protocol (steps 458 and 412). In addition, the client may store the SSID for future use (step 456) in any suitable memory location within the client. In this way, the client has been wirelessly provisioned with the SSID for any future connection attempts between the client and the corresponding network.

Beaconing will continue, provided any associations remain active (e.g., as noted in the association table formed in step 408). When communication is complete, the wireless client may disassociate (step 460). When the last associated client disassociates or is disassociated (step 416), the host AP may enter back into silent beacon mode (step 414). This saves power, provides an improved level of privacy, and prevents unnecessary use of the frequency spectrum. Alternatively, in step 420, the host AP may choose to delay changing back to silent mode based on instructions from an internal logic unit or application within the AP (e.g., software or API in the operating system or in a driver). This would permit the network to continue to be visible for some time after the last station has disassociated so that other services could be consumed, if deemed necessary by the host AP.

Figure 5:
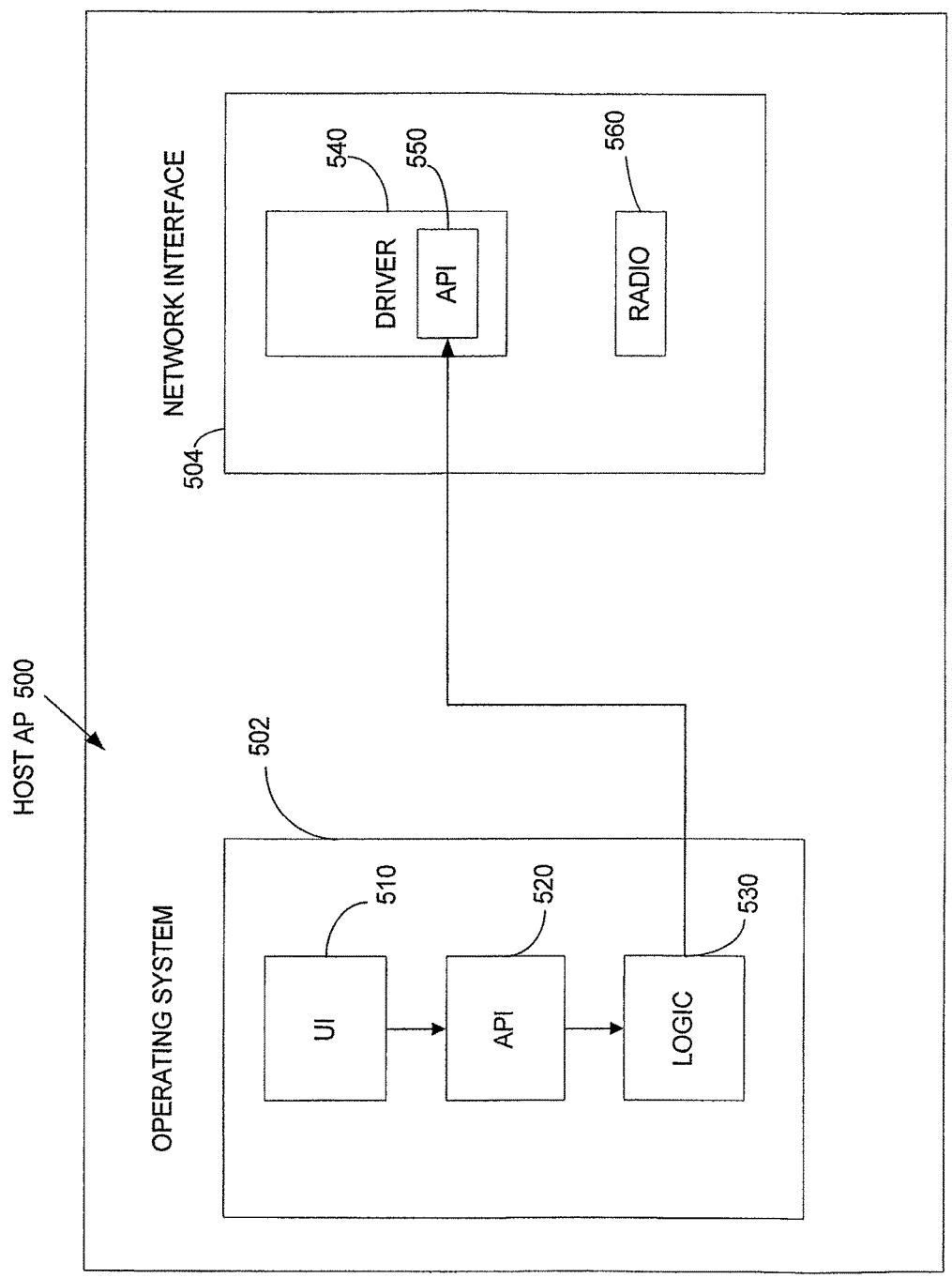
FIG. 5 is a block diagram of a portable computer according to an embodiment of the invention.

FIG. 5 illustrates an example of the structure within a host access point 500 in which embodiments of the invention may be implemented. For example, a host AP 500 may have an operating system 502 and a network interface 504, such as a wireless network interface card as is known in the art. According to example embodiments discussed above with respect to FIGS. 3-4, an input from within the host AP may act as a trigger to activate beaconing.

A triggering input may be user input received through interface 510, via software, or via an API 530 and/or a logic unit 560 within the operating system 502. For example, a user may indicate through UI 510 that the host 500 should configure itself to allow a device to form an association with the access point.

Regardless of the source of the triggering input, the triggering input may be provided through an application programming interface 520 to control logic 530. Control logic 530 may determine based on input, and any prior input that sets the state of the device, an appropriate mode of operation for access point 500.

Regardless of the source of the triggering input or inputs, logic 530 may determine an appropriate command or commands to apply network interface 504 to cause the network interface to have the appropriate beaconing behavior. This command information may be applied to radio 560 within the network interface 504 through driver 540. In the embodiment illustrated, commands to turn on or off beaconing are applied to driver 540 through an API 550. However, any suitable mechanism for translating trigger events into commands that control the beacons transmitted by a radio may be used.

Having just described some representative embodiments, there may be several variations on these embodiments. For example, active beacon mode and silent mode were earlier described, respectively, as the beacon being turned on and off. In some embodiments, beaconing may not be entirely off to achieve the intended effect of reducing spectral congestion. Rather, silent mode could also indicate a reduction in the rate at which beacons are being transmitted. For example, a beacon interval may typically be set to 100 ms in active beaconing mode of a device operating according to an IEEE 802.11 protocol. In some embodiments of the invention, a host AP may use a beacon interval of 500 ms or more when in silent mode. In other embodiments, a host AP in silent mode may use a beacon interval of 1 second or more in silent mode.

In such embodiments where the silent mode comprises broadcasting beacons at a lower rate or longer interval than during active beaconing mode, the beacon packets broadcast while in silent mode may still indicate a beacon interval value identical or substantially equivalent to the beacon interval value when the host AP is in the active beacon mode. In this way, even if the host AP is in the silent mode, the client will still have the correct beacon interval value; and the client may operate as if the AP is in active beaconing mode, where beacons had just been missed. Once the AP returns to active beaconing mode, the client may rely on the previously obtained beacon interval mode to continue or resume normal communication.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, embodiments of the invention may be provided using a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, embodiments of the invention may be provided via a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:
1. A computing device, comprising:
  a wireless network interface configured to interface the computing device to one or more other computing devices; and
  at least one memory and at least one processor that are respectively configured to store and execute instructions, the instructions for causing the computing device to perform operations, the operations including:
    operating in a first mode in which the wireless network interface does not transmit information regarding an access point functionality of the computing device;
    receiving a first trigger indicative of wireless communications between the computing device and a remote device via the wireless network interface;
    transitioning to a second mode;

operating in the second mode in which the wireless network interface transmits the information regarding the access point functionality of the computing device;

receiving a second trigger indicative of an end of the wireless communications between the computing device and the remote device, wherein the second trigger comprises at least one of:
  a reduction of network associations between the computing device and the one or more other computing devices via the wireless network interface,
  an expiration of a predetermined time period during which no associations are established with the computing device via the wireless network interface, or
  a network disassociation of a last wireless client device from the computing device via the wireless network interface; and in response to the second trigger, transitioning to the first mode in which the wireless network interface does not transmit information regarding the access point functionality of the computing device.

2. The computing device of claim 1, wherein the information regarding the access point functionality includes a beacon of a standardized wireless networking protocol.

3. The computing device of claim 1, wherein the information regarding the access point functionality includes an identifier of a wireless network and at least one operational parameter for the wireless network.

4. The computing device of claim 1, wherein the operations also include:
  transitioning the wireless network interface between the first mode and the second mode at predefined intervals.

5. The computing device of claim 1, wherein the operations also include:
  receiving a request that includes an identifier of a wireless network from a device that is not associated with the wireless network; and
  transmitting a message that enables the device to utilize the access point functionality.

6. The computing device of claim 1, wherein transitioning the wireless network interface to the first mode includes:
  transitioning the wireless network interface to the first mode after a delay time following the second trigger.

7. The computing device of claim 1, wherein the remote device is one of the one or more other computing devices.

8. An apparatus, the apparatus comprising:
  a wireless network interface; and
  a memory and a processor that are respectively configured to store and execute instructions, including instructions that cause the apparatus to:
    operate the apparatus in a first mode in which the apparatus does not transmit information regarding an access point functionality provided via the wireless network interface;
    form of an association with a remote device via the wireless network interface;
    transition the apparatus to a second mode in which the apparatus provides the access point functionality via the wireless network interface, and transmits information regarding the access point functionality;
    receive a second trigger indicative of a determination that fewer remote devices have active network associations with the apparatus via the wireless network interface; and
    in response to the second trigger, transition the apparatus to the first mode.

9. The apparatus of claim 8, wherein the instructions also cause the apparatus to:
  generate the information regarding the access point functionality for transmission over the wireless network interface.

10. The apparatus of claim 8, wherein the wireless network interface is configured to selectively generate and transmit the information regarding the access point functionality.

11. The apparatus of claim 8, wherein the wireless network interface is configured to selectively and periodically transmit the information regarding the access point functionality.

12. The apparatus of claim 8, wherein the information regarding the access point functionality is a beacon for a wireless network.

13. The apparatus of claim 8, wherein the information regarding the access point functionality includes an identifier of a wireless network and at least one operational parameter for the wireless network.

14. A method, the method comprising:
  operating, by a first computing device, in a first mode in which beaconing for a wireless network by the first computing device is disabled;
  receiving, by the first computing device, an indication of an establishment of an active communications session between the first computing device and another device over the wireless network;
  operating, by the first computing device, in a second mode in which beaconing for the wireless network by the first computing device is enabled, and in which the first computing device is operated as an access point for the wireless network;
  receiving an indication of a reduction in active communications sessions between the first computing device and other devices over the wireless network; and
  in response to the indication of the reduction, returning to the first mode.

15. The method of claim 14, wherein the indication of the establishment comprises information received through an application programming interface (API).

16. The method of claim 15, wherein the API is in an operating system of the first computing device.

17. The method of claim 15, wherein the API is an API to a driver for the wireless network interface of the first computing device.

18. The method of claim 14, wherein the indication of the establishment is generated by a user input to the first computing device.

19. The method of claim 14, wherein the indication of the establishment represents establishment of an association between a wireless client device and the first computing device over the wireless network.

20. The method of claim 14, further comprising:
  receiving, from a wireless client device, a request that includes a network identifier; and
  selectively transmitting a response to the wireless client device if the network identifier in the message corresponds to the wireless network.

* * * * *